United States Patent
Chandrasekar et al.

(10) Patent No.: US 7,933,928 B2
(45) Date of Patent: Apr. 26, 2011

(54) METHOD AND MECHANISM FOR LOADING XML DOCUMENTS INTO MEMORY

(75) Inventors: Sivasankaran Chandrasekar, Palo Alto, CA (US); Nipun Agarwal, Santa Clara, CA (US); Namit Jain, Santa Clara, CA (US); Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 41 days.

(21) Appl. No.: 11/317,101

(22) Filed: Dec. 22, 2005

(65) Prior Publication Data

US 2007/0150432 A1    Jun. 28, 2007

(51) Int. Cl.
G06F 7/00 (2006.01)
G06F 17/30 (2006.01)
G06F 12/00 (2006.01)

(52) U.S. Cl. .................................... 707/802; 707/821

(58) Field of Classification Search ....... 707/1, E17.127, 707/802, 821, 999.001
See application file for complete search history.

(56) References Cited

U.S. PATENT DOCUMENTS

| | | |
|---|---|---|
| 5,295,261 A | 3/1994 | Simonetti |
| 5,404,513 A | 4/1995 | Powers et al. |
| 5,467,471 A | 11/1995 | Bader |
| 5,643,633 A | 7/1997 | Telford et al. |
| 5,680,614 A | 10/1997 | Bakuya et al. |
| 5,724,577 A | 3/1998 | Exley et al. |
| 5,734,887 A | 3/1998 | Kingberg et al. |
| 5,870,590 A | 2/1999 | Kita et al. |
| 5,878,415 A | 3/1999 | Olds |
| 5,974,407 A | 10/1999 | Sacks |
| 5,987,506 A | 11/1999 | Carter et al. |
| 6,003,040 A | 12/1999 | Mital et al. |
| 6,018,747 A | 1/2000 | Burns et al. |

(Continued)

FOREIGN PATENT DOCUMENTS

EP    1 241 589 A2    9/2002

(Continued)

OTHER PUBLICATIONS

Claims, International application No. PCT/US2006/045700, 2 pages.
European Patent Office, "Notification of Transmittal of the International Search Report and the Written Opinion of the International Searching Authority, or the Declaration", International application No. PCT/US2006/045700, dated Jul. 20, 2007, 12 pages.

(Continued)

*Primary Examiner* — Mohammad Ali
*Assistant Examiner* — Griselle Corbo
(74) *Attorney, Agent, or Firm* — Hickman Palermo Truong & Becker LLP

(57) ABSTRACT

A method and apparatus for loading an XML document into memory is provided. A client loads one or more array elements into a first partition of an array that is maintained in memory. Each array element represents an XML element of an XML document. Upon determining that an amount of data maintained in the first partition exceeds a first threshold, the client subsequently loads array elements into a new partition of the array. Upon determining that an amount of data maintained in the memory of the client exceeds a second threshold, the array elements of the least recently used partition are persistently stored in a database without persistently storing the entire XML document. When the last XML element of the XML document is loaded into a partition of the array, that partition is persistently stored in the database, thereby causing the entire XML document to be stored in the database.

15 Claims, 3 Drawing Sheets

U.S. PATENT DOCUMENTS

| | | | |
|---|---|---|---|
| 6,038,563 A | 3/2000 | Bapat et al. | |
| 6,055,544 A | 4/2000 | DeRose et al. | |
| 6,061,684 A | 5/2000 | Glasser et al. | |
| 6,115,705 A * | 9/2000 | Larson | 707/3 |
| 6,128,610 A | 10/2000 | Srinivasan et al. | |
| 6,141,655 A | 10/2000 | Johnson et al. | |
| 6,154,741 A | 11/2000 | Feldman | |
| 6,189,012 B1 | 2/2001 | Mital et al. | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,330,573 B1 | 12/2001 | Salisbury et al. | |
| 6,343,287 B1 | 1/2002 | Kumar et al. | |
| 6,356,920 B1 | 3/2002 | Vandersluis | |
| 6,360,302 B1 * | 3/2002 | Baylor | 711/147 |
| 6,366,934 B1 | 4/2002 | Cheng et al. | |
| 6,370,537 B1 | 4/2002 | Gilbert et al. | |
| 6,414,610 B1 | 7/2002 | Smith | |
| 6,427,123 B1 | 7/2002 | Sedlar | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,510,434 B1 * | 1/2003 | Anderson et al. | 707/100 |
| 6,519,597 B1 | 2/2003 | Cheng et al. | |
| 6,523,062 B1 | 2/2003 | Bridgman et al. | |
| 6,539,398 B1 | 3/2003 | Hannan et al. | |
| 6,542,911 B2 * | 4/2003 | Chakraborty et al. | 707/206 |
| 6,571,231 B2 | 5/2003 | Sedlar | |
| 6,598,055 B1 | 7/2003 | Keesey et al. | |
| 6,604,100 B1 | 8/2003 | Fernandez et al. | |
| 6,609,121 B1 | 8/2003 | Ambrosini et al. | |
| 6,635,088 B1 | 10/2003 | Hind et al. | |
| 6,636,845 B2 | 10/2003 | Chau et al. | |
| 6,643,633 B2 | 11/2003 | Chau et al. | |
| 6,654,761 B2 * | 11/2003 | Tenev et al. | 707/102 |
| 6,662,342 B1 * | 12/2003 | Marcy | 715/227 |
| 6,684,227 B2 | 1/2004 | Duxbury | |
| 6,697,805 B1 | 2/2004 | Choquier et al. | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye | |
| 6,721,723 B1 * | 4/2004 | Gibson et al. | 707/2 |
| 6,725,212 B2 | 4/2004 | Couch et al. | |
| 6,754,661 B1 | 6/2004 | Hallin et al. | |
| 6,772,350 B1 | 8/2004 | Belani et al. | |
| 6,785,673 B1 | 8/2004 | Fernandez et al. | |
| 6,801,224 B1 | 10/2004 | Lewallen | |
| 6,826,727 B1 | 11/2004 | Mohr et al. | |
| 6,836,778 B2 | 12/2004 | Manikutty et al. | |
| 6,836,857 B2 | 12/2004 | Ten-Hove et al. | |
| 6,883,137 B1 | 4/2005 | Girardot et al. | |
| 6,915,304 B2 * | 7/2005 | Krupa | 707/102 |
| 6,915,307 B1 * | 7/2005 | Mattis et al. | 707/103 R |
| 6,920,457 B2 | 7/2005 | Pressman | |
| 6,957,237 B1 * | 10/2005 | Traversat et al. | 707/206 |
| 6,964,025 B2 | 11/2005 | Angiulo et al. | |
| 7,013,425 B2 | 3/2006 | Kataoka | |
| 7,031,956 B1 | 4/2006 | Lee et al. | |
| 7,043,488 B1 | 5/2006 | Bauer et al. | |
| 7,080,094 B2 | 7/2006 | Dapp et al. | |
| 7,089,239 B1 | 8/2006 | Baer et al. | |
| 7,089,567 B2 | 8/2006 | Girardot et al. | |
| 7,113,942 B2 * | 9/2006 | Levanoni et al. | 707/3 |
| 7,134,072 B1 * | 11/2006 | Lovett et al. | 715/234 |
| 7,139,746 B2 | 11/2006 | Shin et al. | |
| 7,143,397 B2 | 11/2006 | Imaura | |
| 7,162,485 B2 | 1/2007 | Gottlob et al. | |
| 7,171,404 B2 | 1/2007 | Lindblad et al. | |
| 7,171,407 B2 | 1/2007 | Barton et al. | |
| 7,216,127 B2 | 5/2007 | Auerbach | |
| 7,406,522 B2 * | 7/2008 | Riddle | 709/226 |
| 7,451,128 B2 * | 11/2008 | Song et al. | 1/1 |
| 7,457,910 B2 * | 11/2008 | Chang et al. | 711/103 |
| 7,523,119 B2 | 4/2009 | Imamura et al. | |
| 2001/0049675 A1 | 12/2001 | Mandler et al. | |
| 2001/0049818 A1 * | 12/2001 | Banerjia et al. | 717/9 |
| 2002/0056025 A1 | 5/2002 | Qiu et al. | |
| 2002/0073019 A1 | 6/2002 | Deaton | |
| 2002/0078068 A1 | 6/2002 | Krishnaprasad et al. | |
| 2002/0087596 A1 * | 7/2002 | Lewontin | 707/513 |
| 2002/0116371 A1 * | 8/2002 | Dodds et al. | 707/3 |
| 2002/0116457 A1 | 8/2002 | Eshleman et al. | |
| 2002/0133484 A1 | 9/2002 | Chau et al. | |
| 2002/0143512 A1 | 10/2002 | Shamoto et al. | |
| 2002/0152267 A1 | 10/2002 | Lennon | |
| 2002/0156811 A1 | 10/2002 | Krupa | |
| 2002/0184188 A1 * | 12/2002 | Mandyam et al. | 707/1 |
| 2002/0184401 A1 | 12/2002 | Kadel, Jr. et al. | |
| 2002/0188613 A1 | 12/2002 | Chakraborty et al. | |
| 2003/0004937 A1 | 1/2003 | Salmenkaita et al. | |
| 2003/0009361 A1 | 1/2003 | Hancock et al. | |
| 2003/0065659 A1 | 4/2003 | Agarwal et al. | |
| 2003/0069881 A1 | 4/2003 | Huttunen | |
| 2003/0078906 A1 | 4/2003 | Ten-Hove et al. | |
| 2003/0093626 A1 | 5/2003 | Fister | |
| 2003/0093672 A1 | 5/2003 | Cichowlas | |
| 2003/0101194 A1 | 5/2003 | Rys et al. | |
| 2003/0115421 A1 * | 6/2003 | McHenry et al. | 711/133 |
| 2003/0131051 A1 | 7/2003 | Lection et al. | |
| 2003/0140308 A1 * | 7/2003 | Murthy et al. | 715/500 |
| 2003/0172135 A1 | 9/2003 | Bobick et al. | |
| 2003/0177341 A1 | 9/2003 | Devillers | |
| 2003/0182624 A1 | 9/2003 | Large | |
| 2003/0212662 A1 | 11/2003 | Shin et al. | |
| 2003/0212664 A1 | 11/2003 | Breining et al. | |
| 2003/0236903 A1 * | 12/2003 | Piotrowski | 709/231 |
| 2004/0010752 A1 | 1/2004 | Chan et al. | |
| 2004/0043758 A1 | 3/2004 | Sorvari et al. | |
| 2004/0044659 A1 | 3/2004 | Judd et al. | |
| 2004/0064466 A1 | 4/2004 | Manikutty et al. | |
| 2004/0066529 A1 * | 4/2004 | Wu et al. | 358/1.15 |
| 2004/0088320 A1 | 5/2004 | Perry | |
| 2004/0088415 A1 * | 5/2004 | Chandrasekar et al. | 709/226 |
| 2004/0132465 A1 | 7/2004 | Mattila et al. | |
| 2004/0143791 A1 | 7/2004 | Ito et al. | |
| 2004/0148278 A1 | 7/2004 | Milo et al. | |
| 2004/0167864 A1 | 8/2004 | Wang et al. | |
| 2004/0176958 A1 | 9/2004 | Salmenkaita et al. | |
| 2004/0205551 A1 | 10/2004 | Santos | |
| 2004/0220912 A1 | 11/2004 | Manikutty et al. | |
| 2004/0225680 A1 | 11/2004 | Cameron et al. | |
| 2004/0230667 A1 | 11/2004 | Wookey | |
| 2004/0260691 A1 | 12/2004 | Desai et al. | |
| 2004/0261019 A1 | 12/2004 | Imamura et al. | |
| 2004/0267760 A1 | 12/2004 | Brundage et al. | |
| 2004/0268244 A1 | 12/2004 | Levanoni et al. | |
| 2005/0033733 A1 | 2/2005 | Shadmon et al. | |
| 2005/0038688 A1 | 2/2005 | Collins et al. | |
| 2005/0050016 A1 | 3/2005 | Stanoi et al. | |
| 2005/0050054 A1 | 3/2005 | Clark et al. | |
| 2005/0050058 A1 | 3/2005 | Jain et al. | |
| 2005/0050092 A1 | 3/2005 | Jain et al. | |
| 2005/0091188 A1 | 4/2005 | Pai et al. | |
| 2005/0091588 A1 | 4/2005 | Ramarao et al. | |
| 2005/0097084 A1 | 5/2005 | Balmin et al. | |
| 2005/0102256 A1 * | 5/2005 | Bordawekar et al. | 707/1 |
| 2005/0120031 A1 | 6/2005 | Ishii | |
| 2005/0203957 A1 | 9/2005 | Wang et al. | |
| 2005/0228792 A1 | 10/2005 | Chandrasekaran et al. | |
| 2005/0228818 A1 | 10/2005 | Murthy et al. | |
| 2005/0229158 A1 | 10/2005 | Thusoo et al. | |
| 2005/0257201 A1 | 11/2005 | Rose et al. | |
| 2005/0278289 A1 | 12/2005 | Gauweiler et al. | |
| 2005/0278616 A1 | 12/2005 | Eller | |
| 2005/0289125 A1 | 12/2005 | Liu et al. | |
| 2006/0005122 A1 | 1/2006 | Lemoine | |
| 2006/0021246 A1 | 2/2006 | Schulze et al. | |
| 2006/0047717 A1 * | 3/2006 | Pereira | 707/204 |
| 2006/0129524 A1 * | 6/2006 | Levanoni et al. | 707/1 |
| 2006/0129584 A1 | 6/2006 | Hoang et al. | |
| 2006/0200439 A1 * | 9/2006 | Bhatia et al. | 707/1 |

| | | | |
|---|---|---|---|
| 2006/0212467 | A1 | 9/2006 | Murthy et al. |
| 2006/0277179 | A1 | 12/2006 | Bailey |
| 2007/0005624 | A1* | 1/2007 | Wu et al. ............... 707/101 |
| 2007/0043751 | A1* | 2/2007 | Chen et al. ............. 707/101 |
| 2007/0050704 | A1 | 3/2007 | Liu |
| 2007/0113221 | A1 | 5/2007 | Liu et al. |
| 2007/0198467 | A1* | 8/2007 | Wiser et al. ............... 707/1 |
| 2007/0208752 | A1 | 9/2007 | Khaladkar et al. |
| 2007/0271305 | A1 | 11/2007 | Chandrasekar et al. |
| 2008/0082484 | A1 | 4/2008 | Averbuch et al. |
| 2008/0091623 | A1 | 4/2008 | Idicula et al. |
| 2008/0098001 | A1 | 4/2008 | Gupta et al. |
| 2008/0098019 | A1 | 4/2008 | Sthanikam et al. |
| 2008/0098020 | A1 | 4/2008 | Gupta et al. |
| 2009/0112890 | A1 | 4/2009 | Medi et al. |
| 2009/0125495 | A1 | 5/2009 | Zhang et al. |
| 2009/0125693 | A1 | 5/2009 | Idicula et al. |
| 2009/0150412 | A1 | 6/2009 | Idicula et al. |
| 2009/0307239 | A1 | 12/2009 | Chandrasekaran et al. |

FOREIGN PATENT DOCUMENTS

| | | |
|---|---|---|
| EP | 1 241589 A2 | 9/2002 |
| JP | 61-251944 | 11/1986 |
| JP | 62-245352 | 10/1987 |
| JP | 04-004438 | 1/1992 |
| WO | WO 00/49533 A2 | 8/2000 |
| WO | WO 01/42881 A2 | 6/2001 |
| WO | WO 01/59602 A1 | 8/2001 |
| WO | WO 01/61566 A1 | 8/2001 |
| WO | WO 03107576 | 12/2003 |
| WO | WO 2006026534 | 3/2006 |

OTHER PUBLICATIONS

Chakraborty, Krishnendu, et al., "The XML Garbage Collector", XP-002297849, The Source for Developers & Sun Developer Network Site, Technical Articles & Tips, dated Mar. 2002, 5 pages.

Japanese Patent Office, "Notice of Grounds of Rejection", Patent application No. 533163/2003, mailed Aug. 19, 2008 / received Aug. 21, 2008, 7 pages.

Claims, Patent application No. 533163/2003, 9 pages.

Tomoharu, Asami, "Development of Database System by XML, Relaxer, and JDBC", partial English translation, XML Press, Gijutsu-Hyohron Co., Jul. 10, 2001, vol. 3, 2 pages.

Makoto, Onizuka, "XML and Database", partial English translation, XML Magazine, Shoeisha Co., Ltd., Jul. 1, 2000, vol. 10, No. 3, 1 page.

Hironobu, Koyaku, "What is brought to SQL Server 2000 by XML?", partial English translation, Enterprise Servers, IDG Japan, Dec. 1, 2000, vol. 3, No. 12, 1 page.

U.S. Appl. No. 11/716,074, filed Mar. 8, 2007, Interview Summary, Mailing Date Feb. 17, 2010.

U.S. Appl. No. 10/648,577, filed Aug. 25, 2003, Notice of Allowance, Mailing Date Jan. 26, 2010.

"EE XML/Binary CFI File Handling Library User Manual" downloaded from the Internet <http://www.smos.esa.int/BinaryXML/SO-UM-DME-LIPP-0005-BINXML-FH-SUM-E2-RO.pdf > 49 pages.

"Binary XML Library" downloaded from the Internet Aug. 6, 2007, <http://www.smos.esa.int/BinaryXML/ > 2 pages.

"Zapthink" downloaded from the Internet Aug. 6, 2007, <http://www.zapthink.com/report.html?id=ZAPFLASH-11162004 > 3 pages.

Bayardo et al., "An Evaluation of Binary XML Encoding Optimizations for Fast Stream Based XML Processing" *WWW2004* 10 pages.

Bruce, "CubeWerx Position Paper for Binary XML Encoding" (10 pages).

Martin et al., "WAP Binary XML Content Format" downloaded from the Internet Aug. 6, 2007, <http://www.w3.org/TR/wbxml/ > 15 pages.

Liu et al., "XML retrieval: Configurable indexing and ranking for XML information retrieval", Jul. 2004, Proceedings of the 27th annual international ACM SIGIR conference on Research and development in information retrieval SIGIR 04', Pulished by ACM press, 12 pages.

Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.

Min et al., "XML Indexing and compression: XPRESS: a queriable compression for XML data", Jun. 2003, Proceedings of the 2003 ACM SIGMOD international conference on Management of data SIGMOD 03', Published by ACM Press, 8 pages.

Zou et al., "XML Processing: Ctree: a compact tree for indexing XML data" Nov. 2004, Proceedings of the 6th annual international workshop on Web information and data management WIDM 04', Published by ACM Press, 10 pages.

Girardot et al., "Millau: an encoding format for efficient representation and exchange of XMLover the Web", IBM Almaden Research Center, 24 pages.

Shankar Pal et al., "Indexing XML Data Stored in a Relational Database", Proceedings of the $30^{th}$ VLDB Conference, 2004, 12 pages.

Mackenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, $2^{nd}$ Edition, 4 pages.

Peer to Patent, Third Party submission for PGPUB 20090125495, "Optimized streaming evaluation of xml queries", Sep. 1, 2009.

Xiaogang Li, Agrawal, "Efficient Evaluation of XQuery over Streaming Data", 2005, $31^{st}$ VLDB Conference, pp. 265-276.

IBM Research, "XAOS: An Algorithm for Streaming XPath Processing with Forward and Backward Axes" 2003, pp. 1-2.

Chakraborty, Krishnendu, "The XML Garbage Collector", The Source for Developers, Sun Developer Network Site XP-002297849, Mar. 2002.

Chen, Ruey-Shun et al., "Developing an XML framework for metadata system", Trinity College Dublin, Proc. Of the 1st Inter. Sympo. on Information and Communication, pp. 267-272.

Cheng, Josephine et al., "IBM DB2 XML Extender," IEEE, ICDE '00 Conference, San Diego, Feb. 2000, 128 pages.

Lo et al., "XAS: A System for Accessing Componentized, Virtual XML Documents," IEEE, 2001, pp. 493-502.

Manolescu, Dragos, Review of "Metadata solutions: using metamodels, repositories, XML, and enterprise portals to generate information on demand by Adrienne Tannenbaum", Mar. 2003, ACM Press, vol. 28, Issue 2, p. 38.

Myllymaki, Jussi, "Effective Wed data Extraction with Standard XML Technologies," WWW10, May 1-5, 2001, pp. 689-696.

Noser, Hansrudi, et al., "Dynamic 3D Visualization of Database-Defined Tree Structures on the WWW by Using Rewriting Systems," 2000, IEEE, XP-002262516, pp. 247-254.

Oracle XML DB Developer's Guide 11gR1, Oct. 2007, http://download.oracle.com/docs/cd/B28359_01/appdev.111/b28369.pdf.

Peng, Feng et al., "XPath queries on streaming data" (2003) *ACM Press*, pp. 431-442.

Schmidt et al., "Why and How to Benchmark XML Databases," SIGMOND Record, vol. 3, No. 3, Sep. 2001, pp. 27-32.

Vion-Dury, Jean-Yves, "XPath on left and right sides of rules: toward compact XML tree rewriting through node patterns" (2003) *ACM Press*, pp. 19-25.

Vorthmann, S. et al. "Beyond Schemas, Schema Adjuncts and the Outside World," Markup Languages, Online!, vol. 2, No. 3, Jun. 2000, pp. 1-8.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Zisman et al., "Using XML to Build Consistency Rules for Distributed Specifications," Proceedings of the Tenth International Workshop on Software Specification and Design (IWSD'00), IEEE 2000, 8 pages.

Zhang, et al., "TDX: A High Performance Table-driven XML Parser", In proceedings of the $44^{th}$ annual (ACM) Southeast Regional Conference, Mar. 2006, ACM, 6 pages.

Balmin et al., "Incremental Validation of XML Documents", ACM Trans. Database System 24, Dec. 2004, 42 pages.

* cited by examiner

METHOD AND MECHANISM FOR LOADING XML DOCUMENTS INTO MEMORY

RELATED APPLICATION DATA

This application is related to U.S. patent application Ser. No. 10/648,600, entitled "Direct Loading of Semistructured Data," invented by Namit Jain et al., filed on Aug. 25, 2003, referred to below as the "direct loading patent," the disclosure of which is incorporated by reference in its entirety as if fully set forth herein.

This application is also related to U.S. patent application Ser. No. 10/648,577, entitled "Direct Loading of Opaque Types," invented by Namit Jain et al., filed on Aug. 25, 2003, referred to below as the "loading opaque types patent," the disclosure of which is incorporated by reference in its entirety as if fully set forth herein.

This application is also related to U.S. patent application Ser. No. 10/259,278, entitled "Mechanism For Mapping XML Schemas To Object-Relational Database Systems," invented by Ravi Murthy et al., filed on Sep. 27, 2002, referred to below as the "mapping XML schemas patent," the disclosure of which is incorporated by reference in its entirety as if fully set forth herein.

FIELD OF THE INVENTION

The present invention relates to database systems, and in particular, to techniques for loading XML documents into memory.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Structured data conforms to a type definition. For example, a type definition for a "person" type may define distinct attributes such as "name," "birthdate," "height," "weight," and "gender." Each "instance" of a particular type comprises a separate value for each of the attributes defined by the particular type. For example, an instance of the "person" type might comprise values such as "Fred Brown," "Jan. 1, 1980 ," "72 inches," "240 pounds," and "male." Each attribute is also of a type. For example, the "name" attribute might be of a "string" type, the "birthdate" attribute might be of "date" type, and the "gender" attribute might be of an "enumerated" type. Structured data might comprise multiple different instances of the same type.

Different approaches may be used to store structured data into a database. One such approach is called "statement-based path loading." According to the statement-based path loading approach, a client application parses structured data that comprises one or more instances of a type. Values within the structured data correspond to attributes of the type. The client application generates Structured Query Language (SQL) statements, such as INSERT commands, that, when executed by a database server, cause the database server to insert the values into corresponding columns of a database table. Unfortunately, due to its heavy use of the SQL engine, statement-based path loading often suffers in terms of performance and memory consumption.

Another approach for storing structured data into a database is called "direct path loading." Through direct path loading, values within structured data are stored directly into a database without causing the SQL engine to load each row of data. By consulting a control file that is associated with the structured data, a client application can determine the data type of instances of structured data. If the structures of the types are defined to the client application, then, based on those structures, the client application can create an array that corresponds to the types' attributes. The client application can populate the array with values that correspond to that attribute. Once the array is populated, the client application can convert the array into a stream of data that conforms to the format of a database's data blocks. The client application then can stream the data to a database server, which can write the data directly into one or more data blocks in the database. Direct path loading exhibits performance superior to that of statement-based path loading.

Some types indicated by a control file may be standard types that are defined to a client application, e.g., a scalar type is an example of a standard type. However, some types indicated by a control file might not be among the types that are defined to the client application. Types that are not defined to a client application are called "opaque types" relative to the client application, because the internal structure of such types is obscured from, or unknown to, the client application. The internal structure of an opaque type, including the number and types of attributes of the opaque type, often are defined only to a program that implements the opaque type. An opaque type implementor may be external to both the client application and the database server.

An opaque type may be an XML type. An example of an XML type is provided in co-pending U.S. patent application Ser. No. 10/259,278. An XML schema is metadata that describes a hierarchical structure. Instances of the XML schema comprise data that conforms to the structure described by the XML schema. Through XML elements expressed in the structure, an XML schema defines one or more types.

An XML document is a document that contains one or more XML elements that conform to an XML schema. Unfortunately, the amount of memory required to maintain an array representing the XML elements of an XML document may be large. Further, maintaining the control file of an XML document in memory also requires a significant amount of memory, e.g., in some cases the amount of memory required to maintain a control file for an XML document may be ten times the amount of memory to maintain the corresponding XML document in memory. As a result, a large amount of memory is required by a client application to load an XML document into memory when transferring the XML document to a persistent storage. Moreover, transferring XML documents to persistent storage in this manner is very CPU intensive for the client application, which may result in performance degradation.

Consequently, an approach for loading XML documents into memory for use in transferring the XML documents to a persistent storage that avoids the aforementioned problems is advantageous.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
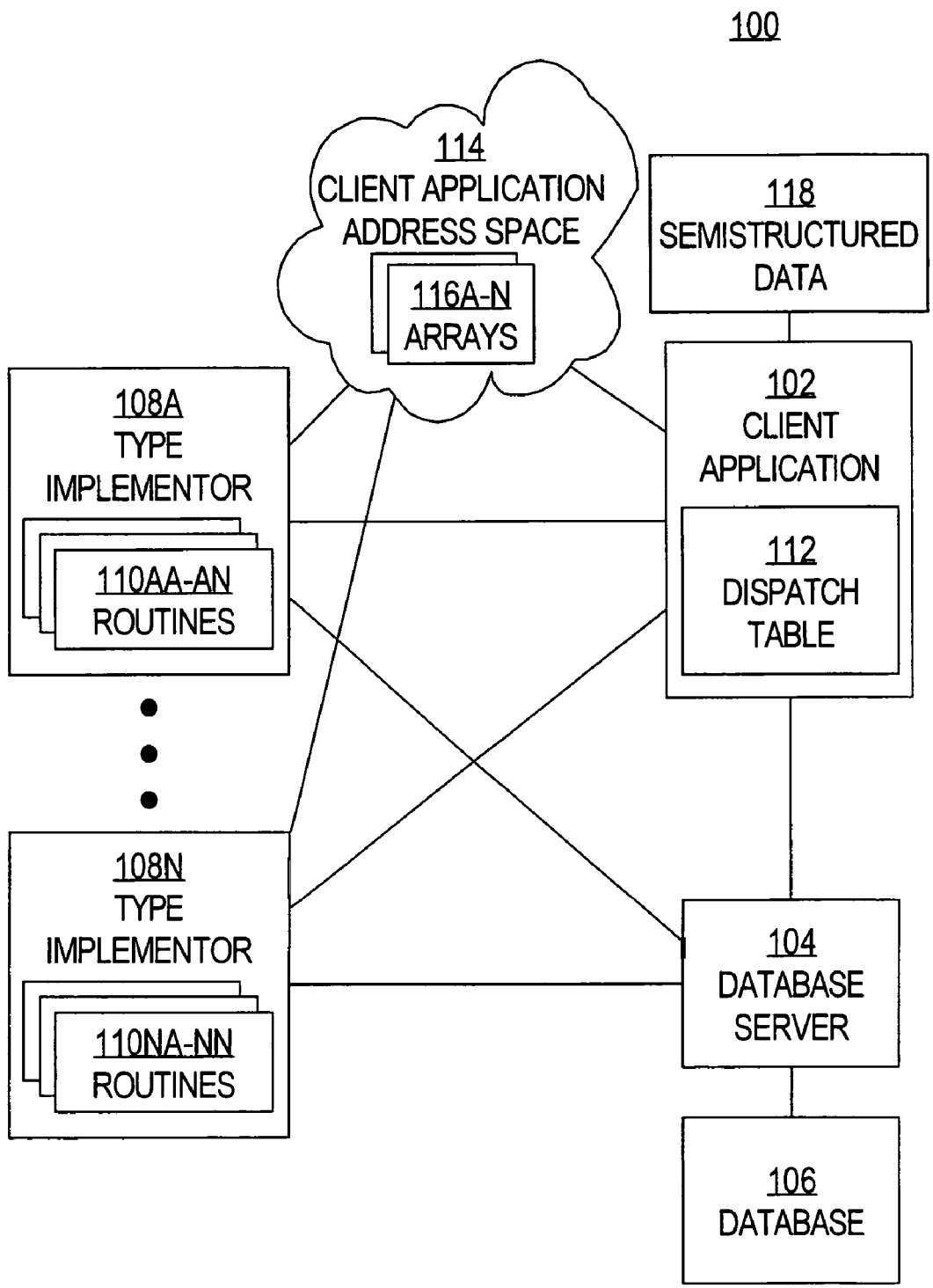
FIG. 1 is a block diagram that illustrates a system in which XML documents may be loaded into memory and transferred to persistent storage according to an embodiment of the present invention.

In the following description, for the purposes of explanation, numerous specific details are set forth in order to provide a thorough understanding of the embodiments of the invention discussed herein. It will be apparent, however, that the embodiments of the invention discussed herein may be practiced without these specific details. In other instances, well-known structures and devices are shown in block diagram form in order to avoid unnecessarily obscuring the embodiments of the invention discussed herein.

Functional Overview

An approach for loading an XML document into memory is provided. According to the embodiments discussed herein, XML elements of a large XML document may be separately loaded into one or more separate logical units (denoted individually herein as a partition) in the memory of a client application, and subsequently the partitions in memory may be processed (for example, a partition may be persistently stored in a database) without processing the entire XML document. In this manner, the amount of memory required by the client application to process the XML document may be minimized, as only a portion of the XML document is maintained in memory at any one time.

In an embodiment, an entity that implements an XML type registers, with a client application, one or more routines that are associated with an XML type. Using those routines, a client application loads one or more array elements that each represents an XML element of an XML document into a first partition of an array that is maintained in memory. A partition is a logical unit for transferring data from memory to a persistent store, such as a database. According to an embodiment, a partition can hold a portion of a data structure, such as an array, and may maintain information that identifies what portion of the data structure is represented by the partition. For example, a particular partition may contain a starting point identifier that identifies a first location of the array where the particular partition starts, and an ending point identifier that identifies a second location of the array where the particular partition ends.

Upon determining that an amount of data maintained in the partition exceeds a first threshold, the client application calls a routine associated with the XML type to create a new partition in the array. Thereafter, the client application loads XML elements of the XML document into array elements of the new partition of the array.

Upon determining that an amount of data maintained in the memory of the client application exceeds a second threshold, the client application persistently stores the array elements of a partition (such as the least recently used partition) maintained in memory to a database. Unless the entire XML document has been loaded into that single partition, a portion of the XML document is stored without persistently storing the entire XML document. The client application will continue to process the XML elements of the XML document in this fashion until the last XML element is processed. When the last XML element of the XML document is loaded into a partition of the array, the client application persistently stores any partitions maintained in memory to the database, thereby causing the entire XML document to be persistently stored in the database.

Having described a high-level overview of an embodiment, an overview of the architecture of an embodiment will be described below.

Architectural Overview

FIG. 1 is a block diagram that illustrates a system 100 in which XML documents may be loaded into memory and transferred to persistent storage according to an embodiment of the invention. System 100 comprises a client application 102, a database server 104, a database 106, and type implementors 108A-N. Client application 102, database server 104, and type implementors 108A-N are coupled communicatively to each other. Database server 104 is coupled communicatively to database 106.

Client application 102 reads or otherwise receives semistructured data 118 as input. Semistructured data 118 is data that conforms to alternative defined structures, rather than a single defined structure. Semistructured data 118 comprises instances of a type. For example, semistructured data 118 may comprise one or more XML instances that conform to an XML schema, e.g., an XML document. Semistructured data 118 also comprises an identity of the type. For example, the type may be identified as an XML type. Semistructured data 118 does not indicate the structure of the type. The structure of the type is not defined to client application 102.

Client application 102 creates an array 116A-N in client application address space 114. Client application address space 114 comprises a segment of memory allocated for use by client application 102. Client application 102 populates array 116A-N by adding array elements to the array. Each array element may represent an XML element of an XML document. Array 116A-N may be populated one partition at a time, as explained in further detail below. Some of the values used to populate array 116A may be specified in semistructured data 118, and other values may be derived from values specified in the semistructured data.

As explained in the loading opaque types patent, type implementers 108A-N may register routines with client application 102 which, when invoke, perform operations involving array 116A-N. For example, one or more of the routines may store values in a particular partition of array 116A-N or may create a new partition. An invoked routine may return, to client application 102, one or more pointers to one or more addresses within client application address space 114 at which one or more populated elements of a partition of array 116A-N can be found. Using the one or more pointers, client application 102 can locate and read the populated rows of a partition of array 116A-N. In this way, client application 102 can determine the amount of data loaded into a particular partition. Dispatch table 112 comprises a separate entry for each of opaque type implementors 108A-108N. Each entry contains memory addresses of routines that are implemented by the opaque type implementor that implements the opaque type that is indicated by that entry. Table 1 below depicts an example of entries within a dispatch table.

TABLE 1

| EXAMPLE DISPATCH TABLE ENTRIES | |
|---|---|
| OPAQUE TYPE IDENTITY | ADDRESSES OF ROUTINES |
| Identity of opaque type implemented by opaque type implementor 108A | Address of routine 110AA |
|  | * |
|  | * |
|  | * |
|  | Address of routine 110AN |
| * | * |
| * | * |
| * | * |

TABLE 1-continued

EXAMPLE DISPATCH TABLE ENTRIES

| OPAQUE TYPE IDENTITY | ADDRESSES OF ROUTINES |
|---|---|
| Identity of opaque type implemented by opaque type implementor 108N | Address of routine 110NA<br>*<br>*<br>*<br>Address of routine 110NN |

One or more of the attributes of the type may be of a nested type that indicates one or more other attributes. For example, a parent type might indicate a first attribute that is of a scalar type, and a second attribute that is of a "purchase order" child type. The "purchase order" type also might indicate several attributes. In this case, the routines associated with the parent type may invoke routines associated with the child type. Client application 102 does not need to be aware of or invoke routines associated with the child type. When a routine is invoked to describe the structure of the parent type, that routine invokes another routine to describe the structure of the child type. When a routine is invoked to create an array for the parent type, that routine invokes another routine to create an array for the child type. When a routine is invoked to populate the array for the parent type, that routine invokes another routine to populate the array for the child type. Each array created may be associated with one or more partitions, as explained below. To preserve the relationship between the array of the parent type and the arrays of any child types, a set identifier that links a row of the parent array with the corresponding rows of the child array is generated and stored in the parent array. Set identifiers for array elements of a partition may be stored in that partition.

Array may be populated independently of each other, although only a single partition of any one array will be populated at any one time, as explained below. Arrays may be loaded and streamed asynchronously and independently.

Based on the populated rows of the partitions, client application 102 generates a data stream. A data stream for a partition of an array may be generated independently of a data stream for another partition of another array. The data stream conforms to the format of data blocks within database 106. As a result, the data stream generated by client application 102 may be written directly to database 106 without causing the SQL engine to load each row of data. Client application 102 streams the data to database server 104. A stream generated based on one array may be sent to the database server independently of a stream generated based on another array. Database server 104 writes the data received from client application 102 directly into one or more data blocks in database 106.

A data block is an atomic unit of storage that stores the records of database. When a database reads or writes records from a database, the smallest unit of data read from or written to persistent store is a data block. Typically, a data block is stored in memory in buffer of buffering system. The data block may not only contain records but also control information used to process data within the data block.

Additional details regarding how to load XML elements into an array maintained in memory are provided in the loading opaque types patent. Having described an illustrative architecture upon which an embodiment may be implemented, the process of creating and using partitions will be described in further detail below.

Creating And Using Partitions

Figure 2:
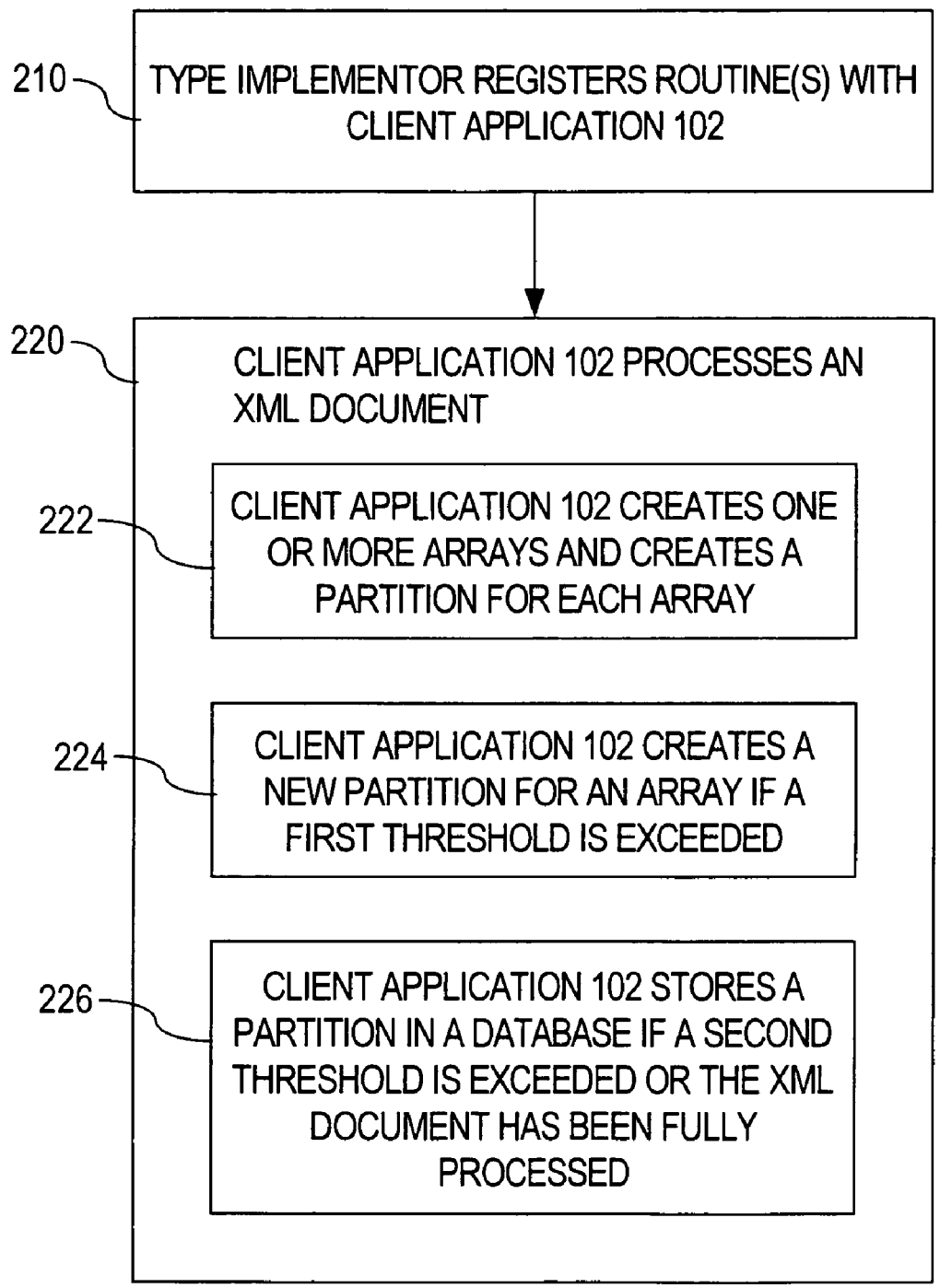
FIG. 2 is a flowchart illustrating the functional steps of creating and using partitions according to an embodiment of the invention.

FIG. 2 is a flowchart illustrating the functional steps of creating and using partitions according to an embodiment of the invention. By performing the functional steps of FIG. 2, the memory requirements to load an XML document into memory may be reduced by establishing certain thresholds that, when exceeded, trigger processing of the partition(s) maintained in memory. Partitions may be persistently stored from memory using the direct path loading technique. As a result, the techniques described herein provide a more scalable approach for loading large XML documents into memory. Further, certain XML documents, that could not previously be loaded into memory due to memory constraints, may be loaded into memory using the techniques of FIG. 2, as only portions of the XML document are loaded into memory at a single time. The functional steps of FIG. 2 shall be explained with reference to FIG. 1.

In step 210, a type implementor registers one or more routines with client application 102 as described above. For example, type implementor 108A may register routines 110AA-AN with client application 102. One or more of routines 110AA-AN may perform the following functions: (a) create a new partition within an array maintained in memory by the client application 102, and (b) populate a row representing an XML element of an XML document into a particular partition of an array. After one or more routines are registered with client application 102, processing proceeds to step 220.

In step 220, client application 102 processes an XML document. In step 220, client application 102 may processes an XML document by loading XML elements of the XML document into one or more partitions maintained in memory, and persistently storing the partitions from memory to database 106. Partitions may be persistently stored, from memory, prior to the entire XML document being loaded into memory to make additional memory available to load further XML elements of the XML document into a partition in memory. The performance of step 220 will be described in further detail below.

In step 222, client application 102 may process an XML document by creating one or more arrays in memory by invoking a routine associated with the XML type of the XML document as described above. Multiple arrays may be created for a single XML document. For example, when a routine is invoked to create an array for a parent type having a child type, that routine invokes another routine to create an array for the child type. Once an array is created in memory for the XML document, client application 102 may create a partition for an array by invoking a routine associated with the XML type of the XML document as described above. Client application 102 loads array elements into only one partition of a particular array at a time.

After the partition(s) and array(s) are created in memory, client application 102 reads an XML element from the XML document. Client application 102 then loads the XML element into an appropriate partition maintained in memory. Client application 102 may then perform steps 224 and 226. After the performance of steps 224 and 226, client application 102 may then repeat the performance (a) loading an XML element from the XML document into a partition in memory, and (b) the performance of steps 224 and 226 until all the XML elements of the XML document have been loaded into a partition in memory. Alternately, client application 102 may perform one or more of steps 224 and 226 after reading two or more XML elements from the XML document into a partition.

In step 224, client application 102 determines if the amount of data maintained in a particular partition ("the full partition") for an array exceeds a threshold (the "partition size threshold"). If client application 102 determines that the amount of data maintained in the full partition of the array does exceed the partition size threshold, then client application 102 creates a new partition for the array by invoking the one or more routines associated with the XML type of the XML document as described above. Thereafter, when client application loads XML elements of the XML document into the array, client application 102 loads the XML elements into the new partition of the array, rather than the full partition of the array.

In an embodiment, client application 102 may determine if the full partition threshold has been exceeded for a particular partition using a pointer to the partition returned by the routine, invoked by client application 102, to create the partition. Using the pointer to the partition, client application 102 may locate and read the rows of the partition to determine whether the amount of data maintained in a particular partition exceeds the partition size threshold.

The partition size threshold may be configured by a user or it may be dynamically determined based on the total amount of memory of client application 102.

The size of each partition created (either in step 222 or in step 224) may by dynamically determined based on, at least in part, the type of data to be stored in the partition or the location, within database 106, where the data loaded into the partition will be eventually stored. For example, the size of a partition may be based on the presence of repeating elements within the XML document. Repeating elements are multiple instances of the same XML element within an XML document. To illustrate, if an XML document corresponds to a bill, then the line items of the bill may be repeating elements since the line items are multiple instances of the same type of data, in this case items of a bill. It is advantageous to store XML elements corresponding to those line items in a single partition, to minimize the amount of the tables, within database 106, which are required to store data loaded into a partition. Thus, the size of the partition may be determined to ensure that XML data, loaded into the partition, will be stored within the smallest amount of tables in database 106. Also, the size of a partition may be determined based on, at least in part, a number of repeating XML elements within the XML document, thereby increasing the likelihood that all the XML elements loaded into the partition will be stored in the same table or similar manner in database 106.

Additionally, when client application 102 invokes a routine to add an XML element of an XML document to a partition of an array, the logic of the routine may consider the XML schema of the XML document when determining how to add the XML element to the array. For example, if the array elements of a first partition of an array are mapped to a first table, and an XML element requested to be added to the array is mapped to a second table, the logic of the routine may create a new partition, and cause the XML element to be added to the new partition. In this way, the mapping between the XML elements of the XML schema to table(s) within database 106 may be considered, by the routine, to determine whether an XML element should be added to an existing partition of an array, or instead, a new partition should be created in which the XML element should be added when client application 102 invokes the routine to add the XML element to a partition of an array.

In step 226, client application 102 determines if an amount of data maintained in the memory of client application 102 exceeds a threshold (the "memory size threshold"). If client application 102 determines that the memory of client application 102 does exceed the memory size threshold, then client application persistently stores a partition maintained in memory, e.g., client application 102 may persistently store the least recently used partition maintained in memory to database 106, although other algorithms may be used to determine which partition, maintained in memory by client application 102, should be persistently stored to database 106. In persistently storing the array elements of a single partition in database 106, client application persistently stores a portion of the XML document without persistently storing the entire XML document (unless the entire XML document can be stored within a single partition).

In step 226, if client application 102 determines that the last XML element of the XML document has been loaded into an array element of a partition in memory, then client application 102 may cause all partitions maintained in memory to be persistently stored in database 106. In this way, after the entire XML document has been processed, all partitions in memory are persistently stored to database 106 to cause any portion of the XML document, which is not currently persistently stored, to be persistently stored.

When a partition is ready to be persistently stored to database 106, client application 102 may generate a data stream from a populated partition. The data stream conforms to the format of data blocks within database 106. As a result, the data stream generated by client application 102 may be written directly to database 106 without causing the SQL engine to load each row of data, e.g., using a single batch INSERT SQL operation. Client application 102 streams the data to database server 104. A stream generated based on one array may be sent to the database server independently of a stream generated based on another array. Database server 104 writes the data received from client application 102 directly into one or more data blocks in database 106. Values in array columns that correspond to hidden columns in database tables are stored in the corresponding hidden columns as a result of the writing.

Along with the array elements, additional information maintained by the partition may be transferred to database 106, such as (a) a starting point identifier for the partition, (b) an ending point identifier for the partition, and (c) one or more set identifiers if the partition is associated with a parent array. In this way, the relationships between the XML elements of the XML documents may be maintained when the XML elements are persistently stored in database 106.

In an embodiment, each partition has its own unit of memory. All array elements of a partition use memory from the partition's memory unit. When a new partition is constructed, a new memory unit is created. When a partition is transferred to a persistent storage, such as database 106, the memory occupied by that partition can be released. This memory may be used by subsequent partitions, thereby minimizing the amount of memory required to perform operations on XML documents in memory.

In an embodiment, instead of loading the entire control file into memory, only a portion of the control file corresponding to the XML elements being currently processed by client application 102 may be loaded into memory. Client application 102 may invoke a routine to determine which portions of the control file should be loaded into memory.

Implementing Mechanisms

Figure 3:
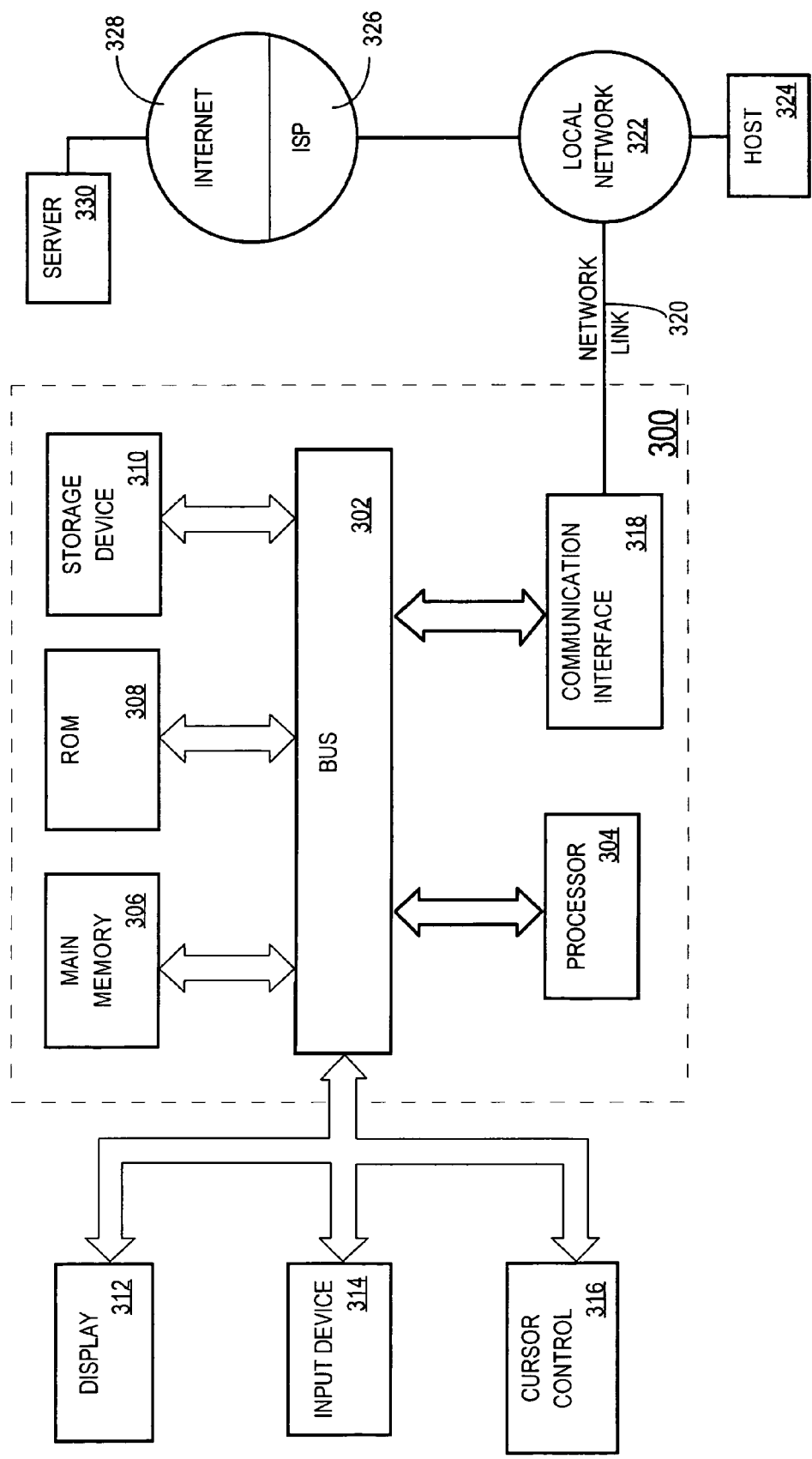
FIG. 3 is a block diagram that illustrates a computer system upon which an embodiment of the invention may be implemented.

In an embodiment, client application 102, database server 104, database 106, and type implementor 108A-108N may each be implemented on a computer system. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for storing a single XML document in multiple database data blocks of a database, comprising:
    at a client, storing data representing at least one XML element in a first partition of an array maintained in client memory of the client, said at least one XML element corresponding to only part of an XML document;
    wherein the array is populated by array elements of a first XML type;
    upon determining that a first amount of data maintained in the first partition exceeds a partition size threshold, (a) creating a new partition of the array, in the client memory, that is different and other than the first partition, and (b) subsequently loading the array elements of the first XML type into the new partition of the array;
    upon determining that a second amount of data maintained in the client memory exceeds a client memory size threshold, transmitting a request to a database server of said database to store data in the first partition in a database data block of said database;
    transmitting a second request to said database server to store data in the new partition in a database data block of said database;
    wherein transmitting a request to a database server of said database to store data in the first partition in a database data block and transmitting a request to said database server to store data in the second partition in a database data block cause the data for the first partition and data for the new partition to be stored in separate and distinct data blocks of said database; and
    wherein the method is performed by one or more computing devices.

2. The method of claim 1, further comprising determining a size of said new partition based on, at least in part, (a) available memory of the client or (b) a location within the database where the array elements of said new partition are to be stored.

3. The method of claim 1, further comprising determining a size of said new partition based on, at least in part, a number of repeating XML elements within said XML document.

4. The method of claim 1, wherein said request specifies to store a data stream that conforms to a data block format of said database managed by said database server.

5. The method of claim 1, wherein the request to said database server to store said data in the first partition in a database is a request to persistently store second array elements of the first partition in said database using a single batch INSERT SQL operation.

6. The method of claim 1, further comprising determining that the first partition is a least recently partition in a set of partitions maintained in the client memory of the client.

7. The method of claim 1,
    further comprising, after storing second array elements of the first partition in said database, ceasing to maintain the first partition in the client memory of the client.

8. A method for storing a single XML document in multiple database data blocks of a database, comprising:
    at a client, loading one or more first array elements into a first partition of an array maintained in client memory of the client, wherein each array element, of the one or more first array elements, represents an XML element of an XML document;
    wherein the array is populated by a plurality of array elements of a first XML type;
    upon determining that a first amount of data maintained in the first partition exceeds a partition size threshold, (a) creating a new partition of the array, in the client memory, that is different and other than the first partition, and (b) subsequently loading the plurality of array elements of the first XML type into the new partition of the array;
    upon determining that a second amount of data maintained in the client memory exceeds a client memory size threshold, persistently storing the first array elements, of the first partition, in said database without persistently storing the entire XML document;
    transmitting a request to a database server of said database to store data in the new partition in a database data block of said database;
    wherein transmitting a request to a database server to store data in the first partition in a database data block and persistently storing the first array elements, of the first partition, in said database without persistently storing the entire XML document cause the data for the first partition and data for the new partition to be stored in separate and distinct data blocks of said database; and
    wherein the method is performed by one or more computing devices.

9. A volatile or non-volatile machine-readable medium carrying instructions, wherein the instructions, when executed by one or more processors, cause the one or more processors to perform the steps of:
    at a client, storing data representing at least one XML element in a first partition of an array maintained in client memory of the client, said at least one XML element corresponding to only part of an XML document;
    wherein the array is populated by array elements of a first XML type;
    upon determining that a first amount of data maintained in the first partition exceeds a partition size threshold, (a) creating a new partition of the array, in the client memory, that is different and other than the first partition, and (b) subsequently loading the array elements of the first XML type into the new partition of the array;
    upon determining that a second amount of data maintained in the client memory exceeds a client memory size threshold, transmitting a request to a database server of said database to store data in the first partition in a database data block of said database;
    transmitting a second request to said database server to store data in the new partition in a database data block of said database;
    wherein transmitting a request to a database server of said database to store data in the first partition in a database data block and transmitting a request to said database server to store data in the second partition in a database data block cause the data for the first partition and data for the new partition to be stored in separate and distinct data blocks of said database.

10. The medium of claim 9, wherein the instructions further comprise instructions, when executed by the one or more processors, cause the one or more processors to perform determining a size of said new partition based on, at least in part, (a) available memory of the client or (b) a location within the database where the array elements of said new partition are to be stored.

11. The medium of claim 9, wherein the instructions further comprise instructions, when executed by the one or more processors, cause the one or more processors to perform determining a size of said new partition based on, at least in part, a number of repeating XML elements within said XML document.

12. The medium of claim 9, wherein said request specifies to store a data stream that conforms to data block format of the database managed by said database server.

13. The medium of claim 9, wherein the request to said database server to store said data in the first partition in the database is a request to persistently store second array elements of the first partition in a database using a single batch INSERT SQL operation.

14. The medium of claim 9, wherein the instructions further comprise instructions, when executed by the one or more processors, cause the one or more processors to perform determining that the first partition is a least recently partition in a set of partitions maintained in the client memory of the client.

15. The medium of claim 9, wherein the instructions further comprise instructions, when executed by the one or more processors, cause the one or more processors to perform, after storing second array elements of the first partition in the database, ceasing to maintain the first partition in the client memory of the client.

* * * * *

UNITED STATES PATENT AND TRADEMARK OFFICE
CERTIFICATE OF CORRECTION

PATENT NO. : 7,933,928 B2
APPLICATION NO. : 11/317101
DATED : April 26, 2011
INVENTOR(S) : Chandrasekar et al.

It is certified that error appears in the above-identified patent and that said Letters Patent is hereby corrected as shown below:

On Title Page 3, in column 1, under "Other Publications", line 39, delete "Pulished' and insert -- Published --, therefor.

On Title Page 3, in column 2, under "Other Publications", line 51, delete "SIGMOND" and insert -- SIGMOD --, therefor.

In column 1, line 44, delete "1980 ,""" and insert -- 1980," --, therefor.

Signed and Sealed this
Eighteenth Day of October, 2011

David J. Kappos
*Director of the United States Patent and Trademark Office*